United States Patent
Byrne et al.

(10) Patent No.: US 7,055,648 B2
(45) Date of Patent: Jun. 6, 2006

(54) ASSEMBLY AND METHOD FOR FAN NOISE REDUCTION FROM TURBOFAN ENGINES USING DYNAMICALLY ADAPTIVE HERSCHEL-QUINCKE TUBES

(75) Inventors: Stuart Byrne, San Diego, CA (US); Jeffrey W. Moe, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 334 days.

(21) Appl. No.: 10/343,567

(22) PCT Filed: Oct. 2, 2001

(86) PCT No.: PCT/US01/30861

§ 371 (c)(1),
(2), (4) Date: Aug. 18, 2003

(87) PCT Pub. No.: WO02/059474

PCT Pub. Date: Aug. 1, 2002

(65) Prior Publication Data

US 2004/0045767 A1    Mar. 11, 2004

Related U.S. Application Data

(60) Provisional application No. 60/237,313, filed on Oct. 2, 2000.

(51) Int. Cl.
   *F02K 1/08*     (2006.01)
   *F01N 1/06*     (2006.01)
   *F01N 1/18*     (2006.01)
   *F02B 27/02*    (2006.01)

(52) U.S. Cl. .................. 181/241; 181/216; 181/253; 181/271; 181/277; 181/219; 60/312; 60/226.3; 381/71.5

(58) Field of Classification Search .............. 181/241, 181/216, 253, 271, 277, 219
   See application file for complete search history.

(56) References Cited

U.S. PATENT DOCUMENTS 3,637,140 A     1/1972  Palovchik (Continued)

FOREIGN PATENT DOCUMENTS

DE             728617         11/1942

(Continued)

OTHER PUBLICATIONS

EP Exam. Report for EP 01 997 991.3, Dec. 8, 2004.

*Primary Examiner*—Edgardo San Martin
(74) *Attorney, Agent, or Firm*—Goodwin Procter LLP

(57) ABSTRACT

An assembly useful in reducing aircraft engine noise such as turbofan engine noise (730) comprises: (i) at least one tube "H-Q" having an inlet end (738), an outlet end (740) and a central tube portion therebetween; and (ii) at least one actuator operatively interconnected to at least one tube, wherein the actuator is capable of causing dynamic response by the tube. The assembly of this invention may be used in a method for reducing noise, the method comprising: (a) providing means for generating non-uniform noise energy about an inner surface and within a disclosure having at least an inlet; (b) providing an assembly for reducing noise comprising; (i) at least one having an inlet end, an outlet end and a central tube portion therebetween, and (ii) at least one actuator operatively interconnected to at least one tube, wherein the actuator is capable of causing dynamic response by the tube; and (c) directing at least a portion of the non-uniform noise into the assembly.

8 Claims, 11 Drawing Sheets

U.S. PATENT DOCUMENTS

| | | | |
|---|---|---|---|
| 3,951,566 A | 4/1976 | Mattei et al. | 415/115 |
| 4,531,362 A | 7/1985 | Barry et al. | |
| 5,271,224 A * | 12/1993 | Cruickshank | 60/314 |
| 5,732,547 A | 3/1998 | Olsen et al. | 60/204 |
| 5,952,621 A | 9/1999 | Curtis et al. | 181/213 |
| 6,003,301 A | 12/1999 | Bratkovich et al. | 60/204 |
| 6,112,514 A | 9/2000 | Burdisso et al. | 60/226.1 |
| 6,234,758 B1 * | 5/2001 | Pawelski | 417/26 |
| 6,595,320 B1 * | 7/2003 | Hwang et al. | 181/253 |
| 6,633,646 B1 * | 10/2003 | Hwang | 381/71.5 |

FOREIGN PATENT DOCUMENTS

| | | |
|---|---|---|
| DE | 4341951 A1 | 12/1992 |
| EP | 1 067 511 A2 | 1/2001 |
| EP | 1067511 A2 * | 1/2001 |
| GB | 1 298 069 | 11/1972 |
| JP | 06348280 | 12/1994 |
| JP | 2003106134 A * | 4/2003 |

* cited by examiner

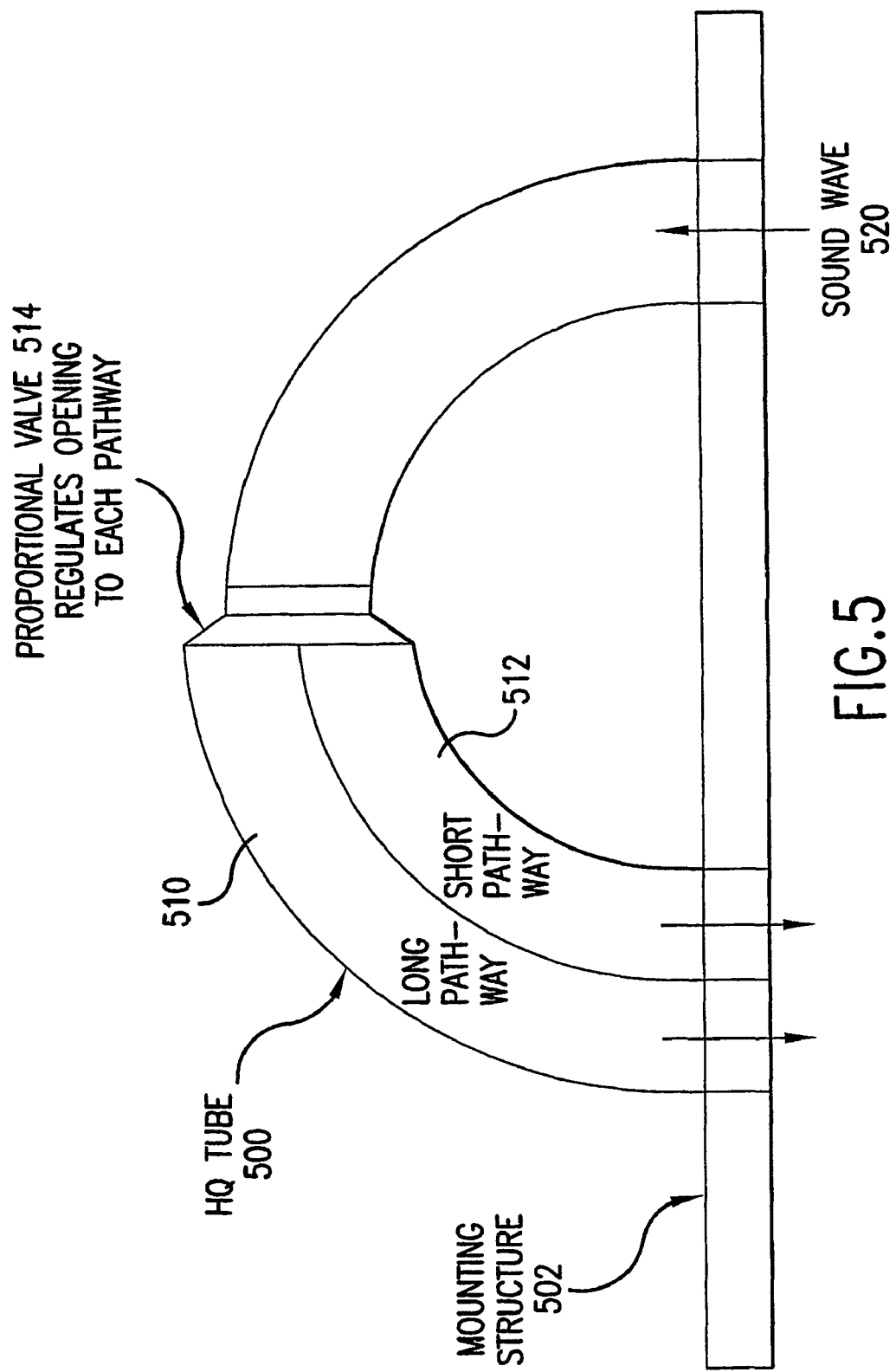

CONSTRICTOR VALVE

EXPOSE HOLES IN HQ TUBE

ASSEMBLY AND METHOD FOR FAN NOISE REDUCTION FROM TURBOFAN ENGINES USING DYNAMICALLY ADAPTIVE HERSCHEL-QUINCKE TUBES

CROSS-REFERENCE TO RELATED APPLICATIONS

This is a national application for International Application No. PCT/US01/30861, which was filed on Oct. 2, 2001 and which published in English on Aug. 1, 2002, which in turn claims priority from U.S. Provisional Application Ser. No. 60/237,313, which was filed on Oct. 2, 2000.

BACKGROUND OF THE INVENTION

1. Field of the Invention

This invention relates to an assembly, method and system for reducing fan noise from a noise-generating system such as a turbofan engine. More particularly, this invention relates to an assembly comprising at least one dynamically adaptable Herschel-Quincke (HQ) tube which is capable of being dynamically adapted with respect to tube geometry and acoustical characteristics to optimize cancellation of the predominant source tone for different engine cycles. The method and system of this invention employ such an assembly to reduce fan noise from noise-generating systems such as turbofan aircraft engines.

2. Background Information

The desirability of reducing the noise generated by aircraft engines such as turbofan engines is well known to those skilled in the art. As disclosed, for example, in U.S. Pat. No. 6,112,514, which is incorporated herein by reference in its entirety, one method of reducing such noise which has been proposed is the use of Herschel-Quincke tubes of appropriate length arranged in an array about a turbofan engine to reduce the noise levels generated by the engine. Such an array of tubes, if properly located about the engine, create destructive energy waves that cancel the acoustic energy in the turbofan engine yet do not contribute to any significant aircraft drag or reduced fuel consumption. As is also disclosed in U.S. Pat. No. 6,112,514, various parameters such as tube length, cross-sectional area etc. may be controlled via a control system responsive to varying engine operational or environmental conditions. In such a control system sound is reintroduced into the system in an out-of-phase relation from the sound propagating from the engine fan to effect sound cancellation. Such a control system may employ feedback or feedforward control, or a combination thereof.

However, it is also known that engine noise tones tend to wander in frequency due to atmospheric conditions or engine cycle settings. Accordingly, it would be desirable to dynamically actuate changes in the tube design parameters in conjunction with a control system employing feedback or feedforward control, or a combination thereof.

It is one object of this invention to provide an assembly comprising one or more dynamically adaptable Herschel-Quincke tubes which is capable of being dynamically adapted with respect to tube geometry and acoustical characteristics to optimize noise reduction in a turbofan engine. The assembly of this invention advantageously permits the tubes to be dynamically actuated in cooperation with a feedback or feedforward control system, or combination thereof, to optimize the noise cancellation effect of the assembly. It is another object of this invention to provide a method which employs such an assembly to reduce fan noise from noise-generating systems such as turbofan aircraft engines. It is yet another object of this invention to provide a system which employs such an assembly to reduce fan noise from noise-generating systems such as turbofan aircraft engines. Other objects, features and advantages of the invention will be apparent to those skilled in the art from the detailed description of the invention and its various embodiments as described herein.

SUMMARY OF THE INVENTION

An assembly useful in reducing aircraft engine noise such as turbofan engine noise comprises: (i) at least one tube having an inlet end, an outlet end and a central tube portion therebetween; and (ii) at least one actuator operatively interconnected to at least one tube, wherein the actuator is capable of causing dynamic response by the tube.

The assembly of this invention may be used in a method for reducing noise, the method comprising: (a) providing means for generating non-uniform noise energy about an inner surface and within an enclosure having at least an inlet; (b) providing an assembly for reducing noise comprising: (i) at least one tube having an inlet end, an outlet end and a central tube portion therebetween, and (ii) at least one actuator operatively interconnected to at least one tube, wherein the actuator is capable of causing dynamic response by the tube; and (c) directing at least a portion of the non-uniform noise into the assembly.

BRIEF DESCRIPTION OF THE DRAWINGS

FIG. 5 depicts another embodiment of this invention wherein a single Herschel-Quincke tube of this invention is applied to a mounting structure.

DETAILED DESCRIPTION OF THE INVENTION

This invention is directed to an assembly, method and system for reducing fan noise from a noise generating system such as a turbofan engine. In a preferred embodiment, the assembly, method and system of this inventions are used with a turbofan engine. However, other systems such as, for example, systems that generate noise which propagates in a partially enclosed area, such as air ventilation ducts, are equally contemplated for use with the present invention. Accordingly, the assembly, method and apparatus of this invention are not limited to use in conjunction with turbofan engines only, but instead may be used with other noise generating devices or systems. The dimensions of the assembly of this invention, including tube length, width, shape and other variables and quantities specified herein may vary depending on the particular application of this invention. Accordingly, numbers and dimensions specified herein are not to be construed as limitations on the scope of this invention, but are meant to be merely illustrative of one particular application.

For exemplary purposes only, the noise reduction system of the present invention is described with reference to reducing noise in turbofan engines. According to this exemplary embodiment, the noise reduction system of the present invention effectively reduces noise energy over a wide range of frequencies for both tonal and broadband components of the inlet and outlet noise for turbofan engines. Specifically, the noise reduction system of the present invention utilizes at least one tube assembly comprising at least one dynamically adaptable Herschel-Quincke tube as described herein, more preferably an array of such tubes arranged preferably in a circumferential or helical array about the turbofan engine to reduce the noise levels generated by the turbofan engine. The assembly or assemblies may also be placed at the inlet, and in other locations, such as, for example, in either the upstream or downstream locations from the turbofan engine. The inlet and outlet of the tubes of the assembly can be placed parallel to the engine axis or at an angle. By attaching an array of such assemblies of dynamically adaptable Herschel-Quincke tubes of appropriate length onto the inlet and/or outlet of the turbofan engine (or other noise generating system), destructive waves are created that cancel the acoustic energy in the turbofan engine, without contributing to any significant aircraft drag or reduced fuel consumption.

Figure 1:
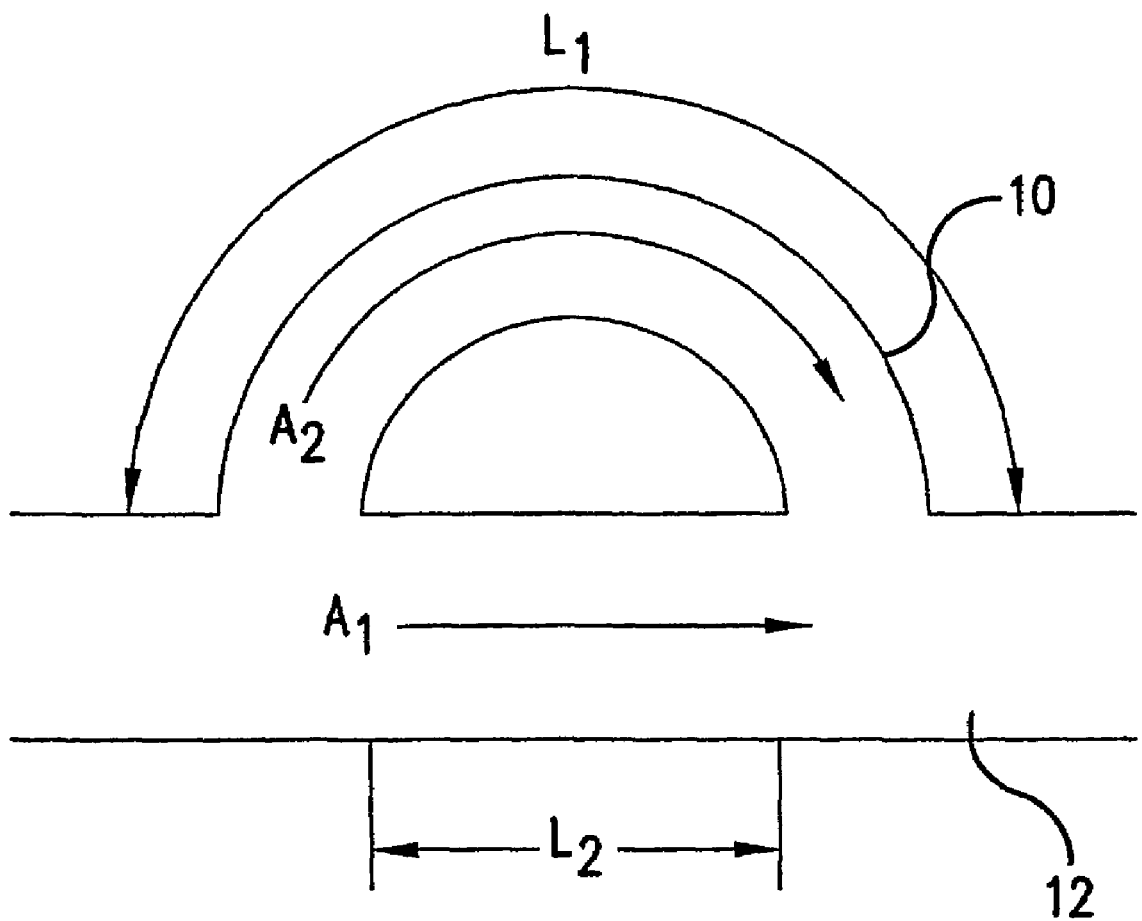
FIG. 1 depicts a single Herschel-Quincke tube applied to a rigid duct for the case of plane waves propagating in the duct and tube, as set forth in FIG. 1 of U.S. Pat. No. 6,112,514.

FIG. 1 is illustrative of the operation of a single Herschel-Quincke tube, and depicts such a tube applied to a rigid duct for the case of plane waves propagating in the duct and tube, as set forth and described in FIG. 1 and col. 4, line 52–col. 5, line 27 of U.S. Pat. No. 6,112,514. Referring now to FIG. 1, a single Herschel-Quincke tube applied to a rigid duct for the case of plane waves propagating in the duct and tube is shown. FIG. 1 shows only a single Herschel-Quincke tube which includes a parallel connection of two pipes having different lengths. That is, the Herschel-Quincke tube is a first pipe 10 having a length $L_1$ connected to second pipe 12 having an effective length $L_2$ between an inlet and an outlet of the first pipe 10, where $L_1$ is greater $L_2$ (e.g., $L_1 > L_2$). In various embodiments, the cross sectional area of the first pipe 10 and the second pipe 12 may be of different areas. The only limitation imposed on the present invention is that $L_1 > L_2$.

Referring still to FIG. 1, in order to reduce the acoustic energy (e.g. noise energy) generated from the noise source, sound generating from the noise source enters the second pipe 12 where it propagates in the second pipe 12 until it reaches the intersection of the second pipe 12 and the first pipe 10. This sound energy is typically uniform sound energy around the surface and within the enclosure. At this junction, the sound energy is divided into two components, where one component enters and propagates through the first pipe 10 (depicted by the curved arrow) and the other component remains and propagates through the shorter second pipe 12 (depicted as the straight arrow).

The sound propagating through the first pipe 10 is delayed due to the longer propagation path of the first pipe 10 and then recombines with the sound propagating through second pipe 12. At some frequencies, the sound re-entering the second pipe 12 from the outlet of the first pipe 10 is now out-of-phase and of nearly the same magnitude from the sound propagating through the second pipe 12, thus reducing noise levels in pipe 12. By adjusting the lengths and cross sectional area (or impedance or other variables) of the first pipe 10, the sound propagating through the first pipe 10 cancels the sound in the shorter second pipe 12 throughout a range of frequencies. Adjustment of the parameters of the first pipe 10 can be performed actively by any known control system (e.g., feedforward, feedback, neural nets, a host of algorithms, etc.) such that the first pipe 10 in combination with the second pipe 12 can eliminate sound energy over a large range of frequencies.

Figure 2A:
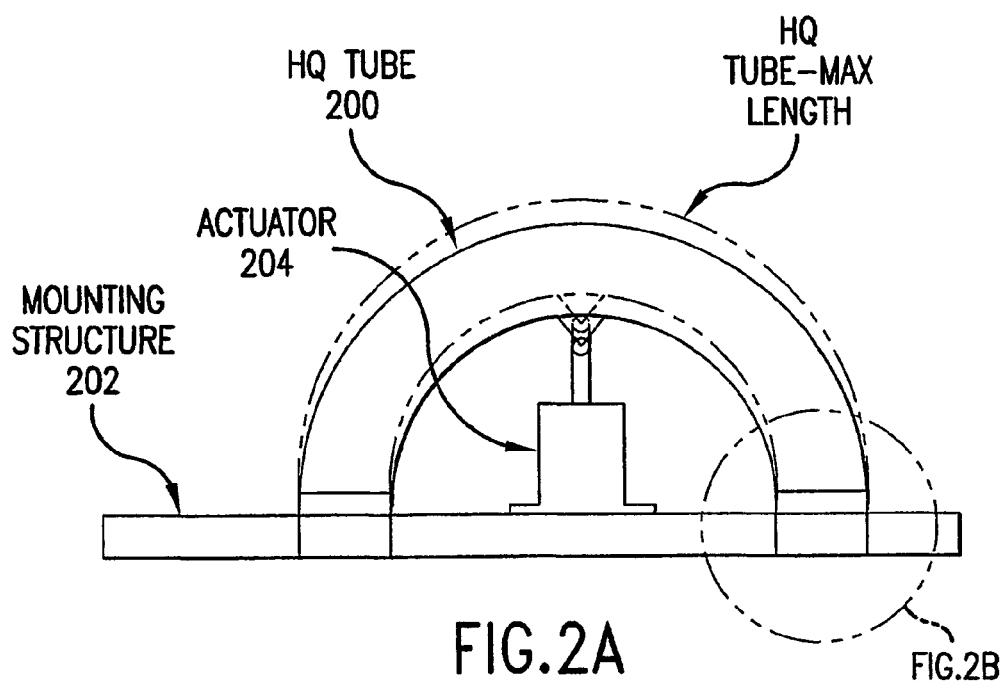
FIG. 2A depicts an embodiment of this invention wherein a single Herschel-Quincke tube of this invention is applied to a mounting structure.
Figure 2B:
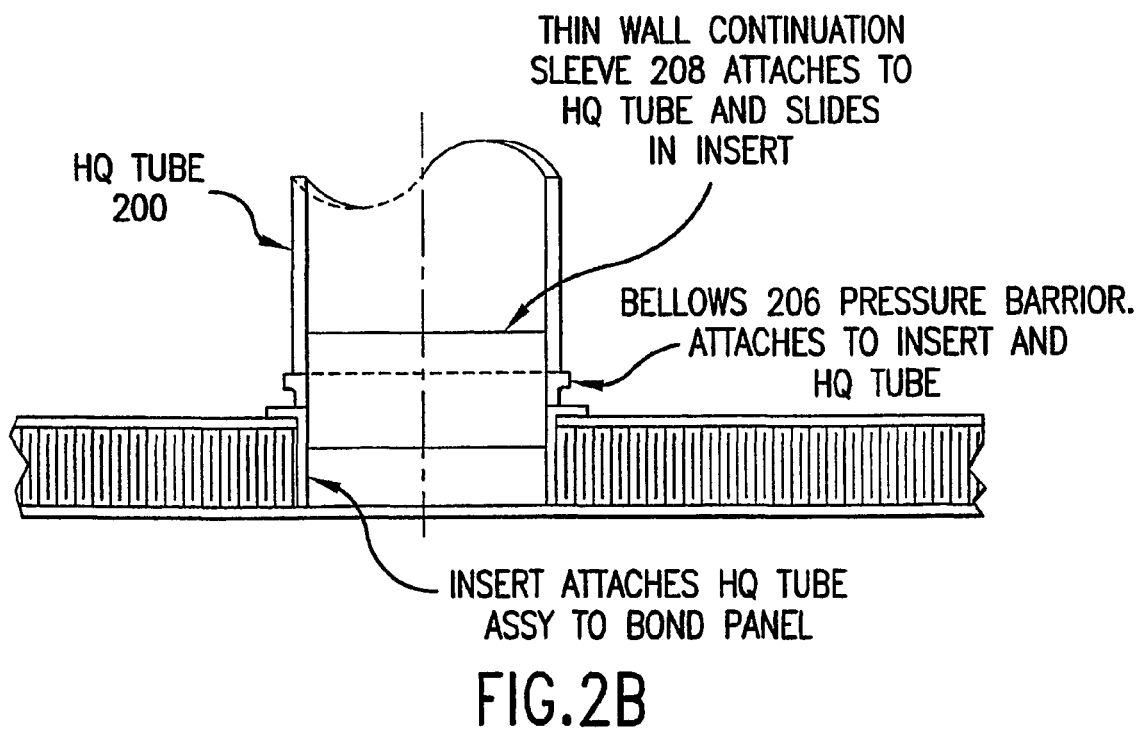
FIG. 2B depicts a detailed view of the tube of FIG. 2A.

Now turning to the present invention, FIG. 2A sets forth a preferred embodiment of the assembly of this invention, in which a dynamically adaptable Herschel-Quincke (AHQ) tube of variable length is affixed to a mounting structure which may be, for example, a bond panel, which may, for example, be a portion of a turbofan engine. As shown, an actuator capable of receiving a control signal is also capable of moving the tube center portion a distance from the mounting structure, thereby increasing or decreasing the total tube length in response to a control signal. As shown in greater detail in FIG. 2B (which shows a detailed section through the centerline of one of the end portions of the tube interconnected to the mounting structure), the ends of the tube employ a bellows and slide tube (which covers the bellows) arrangement which permits the tube to move in response to force applied by the actuator while maintaining structural and acoustic continuity. Although in FIG. 2A a single H-Q tube is shown operatively associated with the actuator, in other embodiments of this invention more than one actuator may be operatively associated with a single tube, or a single actuator may be associated with more than one H-Q tube. This tube and design may also be used in the embodiments depicted in FIGS. 3A–3B, 4A–4B, 5, 6A–6D, 7, 8A–8D, 9B–9C and 10 described herein.

Figure 3A:
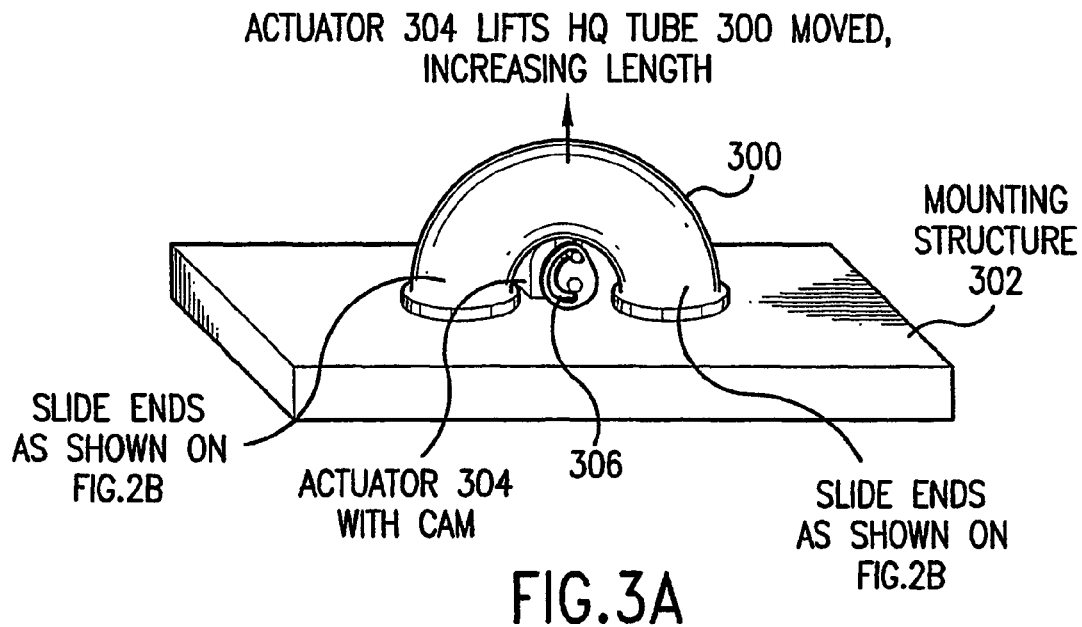
FIG. 3A depicts another embodiment of this invention wherein a single Herschel-Quincke tube of this invention is applied to a mounting structure.
Figure 3B:
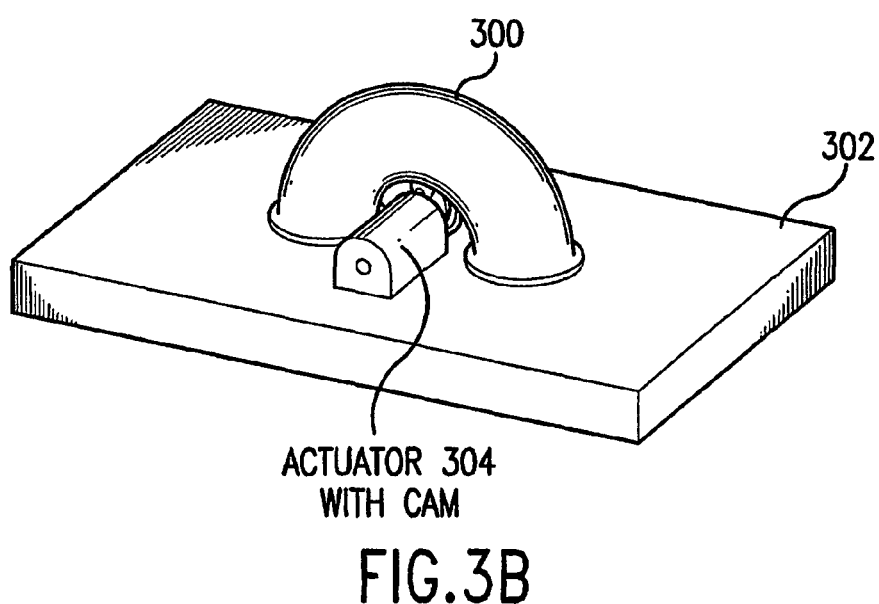
FIG. 3B depicts another view of the design of the tube of FIG. 3A.

FIG. 3A sets forth another preferred embodiment of the assembly of this invention, in which a dynamically adaptable Herschel-Quincke tube is affixed to a mounting structure which may be, for example, a bond panel, which may, for example, be a portion of a turbofan engine. As shown, an actuator comprising a cam is used. The actuator-cam combination is capable of receiving a control signal and is also capable of moving the tube center portion a distance from the mounting structure, thereby increasing the total tube length. The cam lifts and lowers the tube to achieve optimum tube length in response to a control signal. In addition, a series or array of tubes or tube assemblies may be interconnected to a common actuator (not shown). The actuator or actuators used may be of any type known to those skilled in the art, including but not limited to electrical, mechanical, or hydraulic actuators or actuators employing shape memory alloys.

Figure 4A:
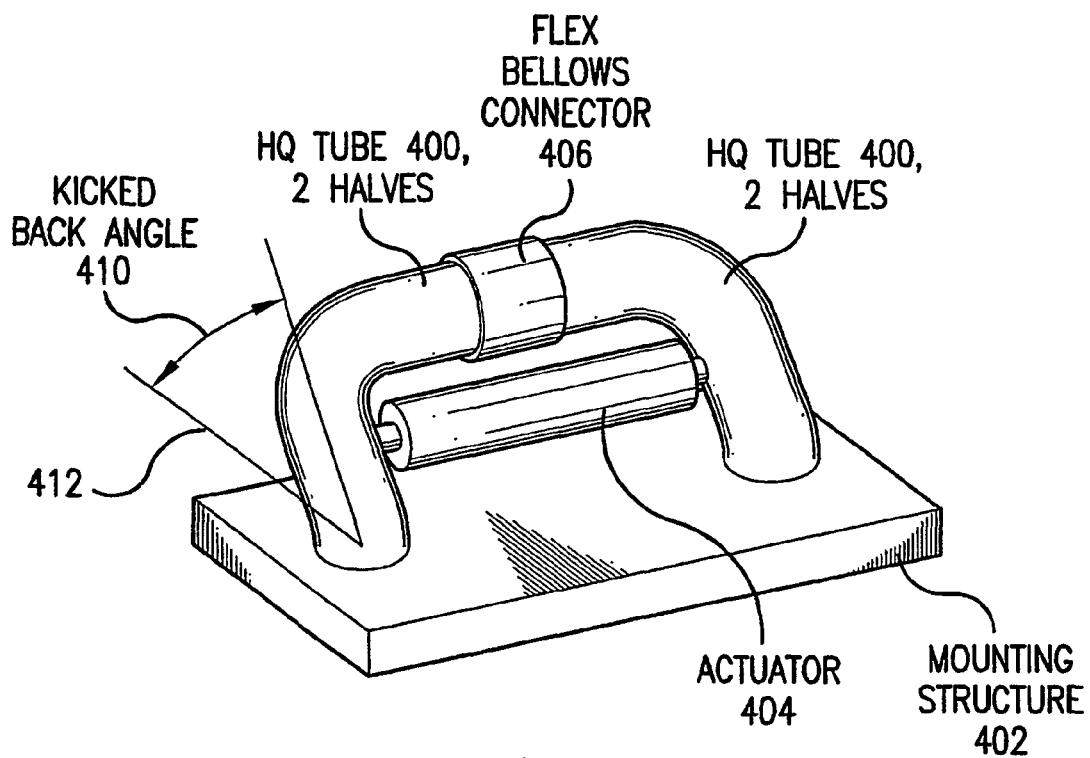
FIG. 4A depicts another embodiment of this invention wherein a single Herschel-Quincke tube of this invention is applied to a mounting structure.
Figure 4B:
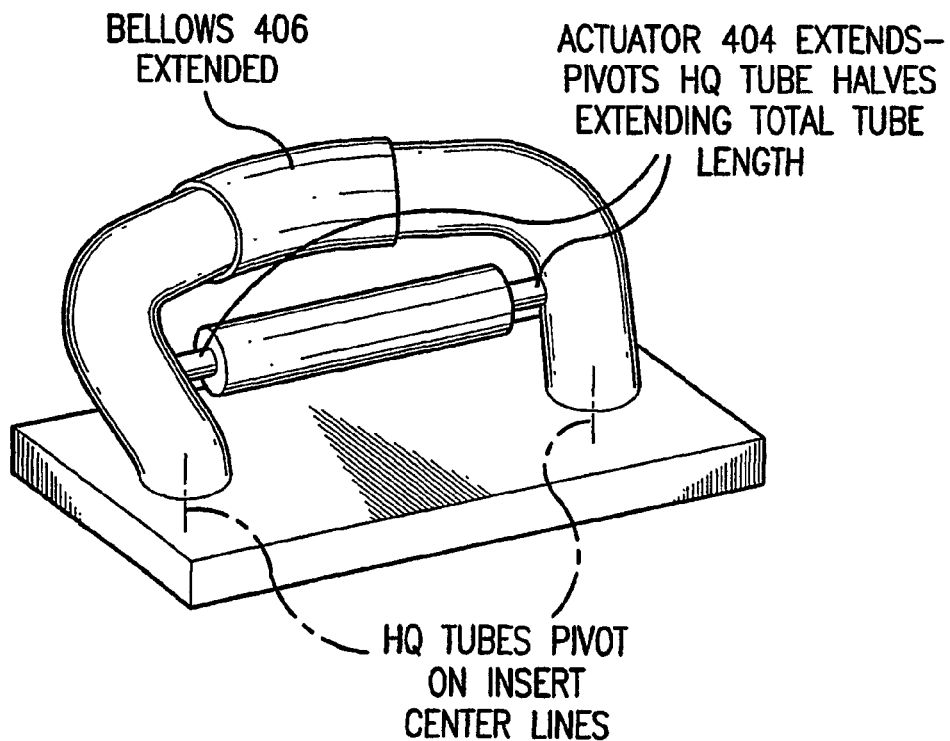
FIG. 4B depicts another view of the design of the tube of FIG. 4A.

FIG. 4A sets forth another preferred embodiment of the assembly of this invention, in which a dynamically adaptable Herschel-Quincke tube is affixed to a mounting structure which may be, for example, a bond panel, which may, for example, be a portion of a turbofan engine. As shown, in this embodiment, the tube itself is an assembly of two tube portions or "halves" interconnected by a flexible bellows. The actuator is mounted horizontally such that a first end of the actuator is pivotably mounted on a first tube portion, and a second end of the actuator is mounted on a second tube portion. In a preferred embodiment the actuator is pivotably affixed at one end proximate to the tube inlet and affixed at the other end proximate to the tube outlet, and the tube inlet and outlet portions are interconnected via a flexible bellows which forms the central tube portion. The actuator may be configured to be responsive to an input control signal, thereby exerting force on the respective tube ends and causing the bellows to expand as depicted in FIG. 4B, thus increasing the total tube length. Similarly, the total tube length may be decreased by the actuator reducing the force applied to the tube ends thereby contracting the bellows. As depicted in FIGS. 4A and 4B, the tube portions may be angled to a "kick back angle" relative to the plane of the mounting structure. The tube ends may also be affixed to the mounting structure to enable them to pivot, as shown in FIG. 4B.

FIG. 5 sets forth another preferred embodiment of the assembly of this invention, in which a dynamically adaptable Herschel-Quincke tube is affixed to a mounting structure which may be, for example, bond panel, which may, for example, be a portion of a turbofan engine. As shown, the tube assembly of this embodiment comprises a multiple pathway (in this embodiment, a dual pathway) configuration in which sound waves entering the tube at one end may propagate along either a longer or shorter pathway before reaching the other end of the tube assembly. In this particular embodiment, only two exit pathways are shown, although it will be understood that additional exit pathways may be used. A proportional valve located proximate to the interconnection of the inlet and exit pathways is responsive to a control signal and regulates the opening of each pathway to the sound waves, thereby proportioning the sound waves between the downstream paths of different length to achieve optimum acoustic performance.

Figure 6A:
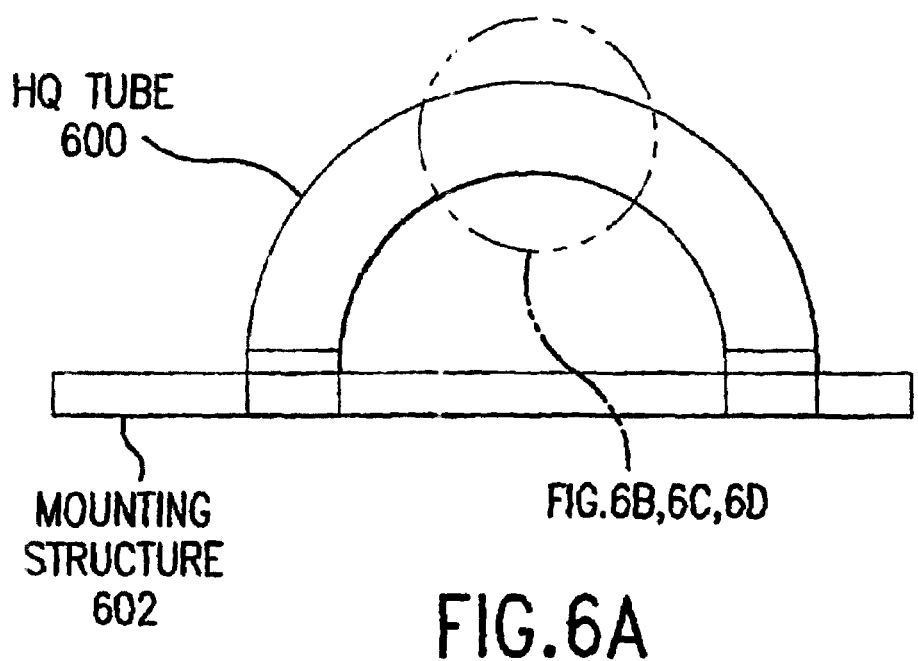
FIG. 6A depicts an overall view of another embodiment of this invention wherein a single Herschel-Quincke tube of this invention is applied to a mounting structure.
Figure 6B:
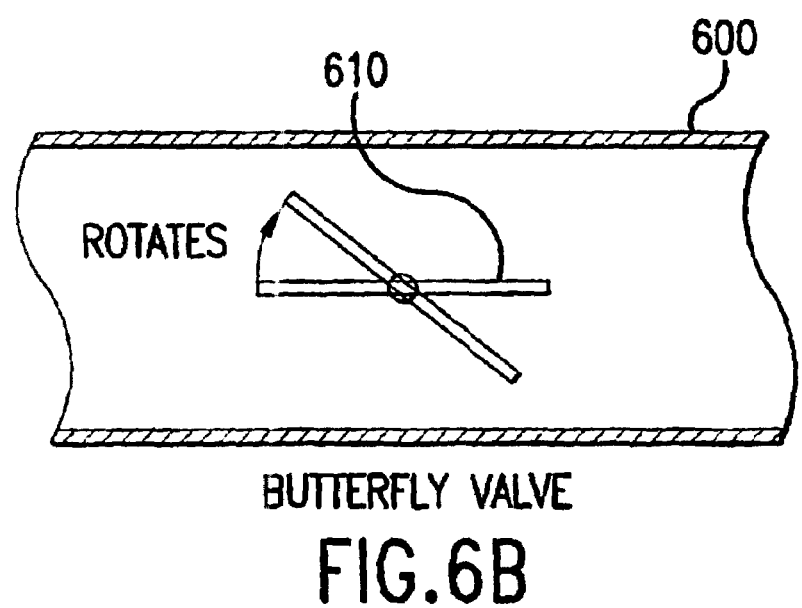
FIGS. 6B–6D depict detail views of additional alternative embodiments of the design of the tube of FIG. 6A.
Figure 6C:
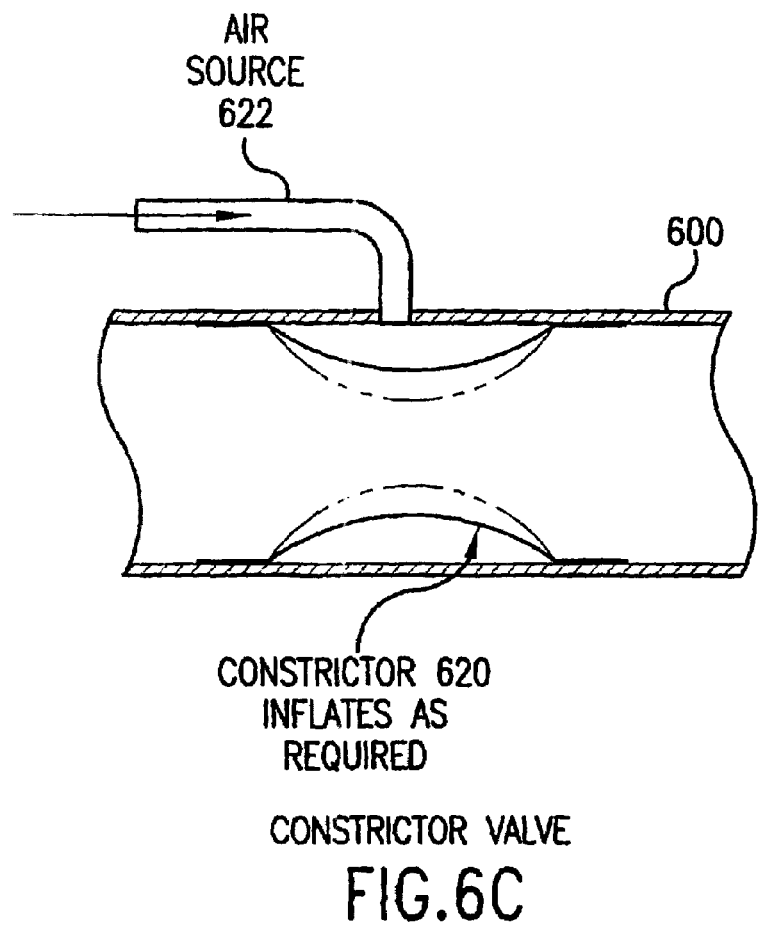
Figure 6D:
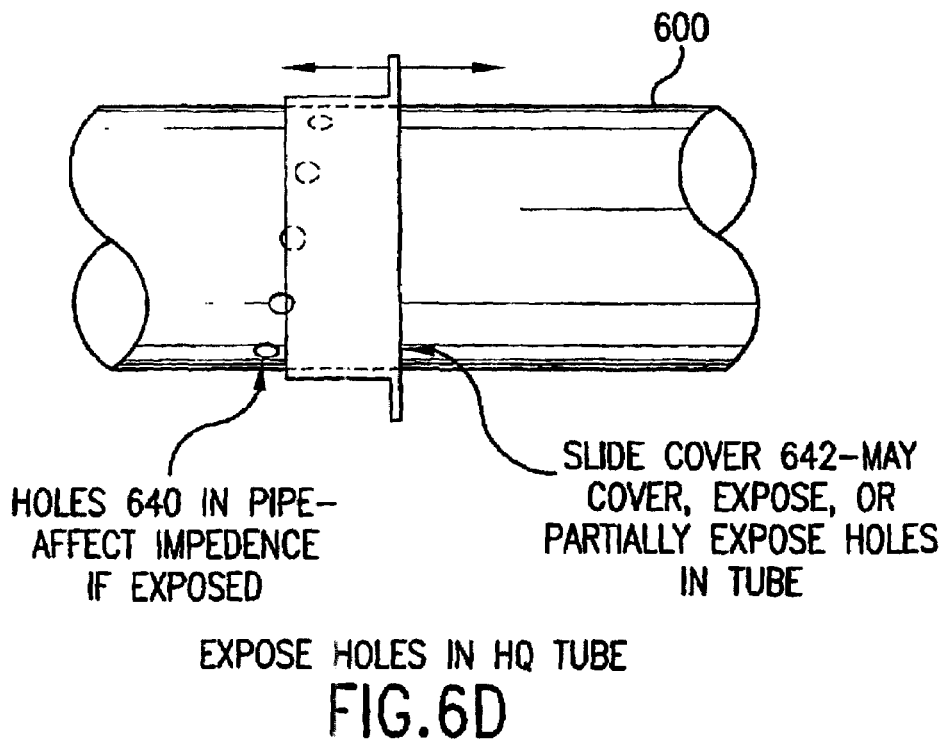

FIGS. 6A–6D set forth additional preferred embodiments of the assembly of this invention, in which a dynamically adaptable Herschel-Quincke tube is affixed to a mounting structure which may be, for example, a bond panel, which may, for example, be a portion of a turbofan engine. As shown, FIG. 6A depicts the tube affixed to a mounting structure. FIGS. 6B–6D depict details regarding the interior portion of the central section of the tube, which are used to vary the acoustic output of the tube. In FIG. 6B, the central tube comprises a valve (shown in FIG. 6B as a butterfly valve, although alternative valving arrangements may be used). The valve is responsive to a control signal, and alters the acoustic characteristics of the tube assembly by varying the path dimensions, direction, or both of the sound waves traveling pathwise via the tube assembly. Similarly, in FIG. 6C a variable tube constrictor is used for the same purpose. In FIG. 6C an air source responsive to a control signal is supplied to inflate or deflate the variable constriction, thereby varying the path dimensions, direction, or both of the sound waves traveling pathwise via the tube assembly. In FIG. 6D, the central portion of the tube comprises a series of orifices such as holes (although these may be slits, etc.), together with a slidable mechanism responsive to a control signal for exposing and covering these orifices. Exposure or covering of the orifices varies the path dimensions, direction or both of the sound waves traveling pathwise via the tube assembly.

Figure 9A:
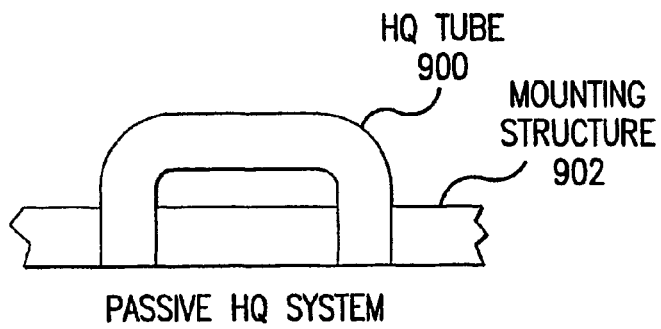
FIG. 9A depicts a "passive" Herschel-Quincke tube arrangement.

FIG. 9A depicts a typical "passive" Herschel-Quincke tube system mounted on a mounting structure such as a rigid duct or bond panel. By "passive" it is meant that the system is not adaptive to an input signal to cause varying of the acoustic characteristics of the tube.

Figure 9B:
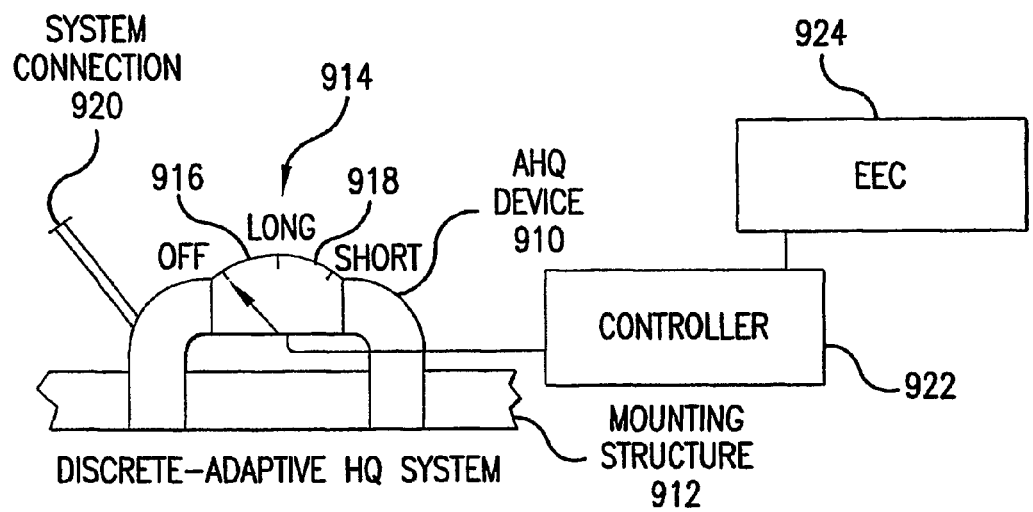
FIG. 9B depicts a "discrete-adaptive" Herschel-Quincke tube arrangement in accordance with an embodiment of this invention.

In contrast, FIG. 9B depicts a "discrete-adaptive" Herschel-Quincke tube system mounted on a mounting structure in accordance with an embodiment of this invention. The embodiment of FIG. 9B has several "discrete" positions (illustrated in FIG. 9B as "long" and "short") employed to vary the acoustic characteristics of the tube and thereby achieve optimal acoustic performance. In embodiments in which the invention is employed in aircraft, for example, the position is chosen depending on flight conditions such as takeoff, sideline, approach, takeoff cutback, etc. as will be well understood by those skilled in the art. As shown, a system connection provides connection with a power source such as a pneumatic, electrical or hydraulic power source used to achieve the desired positions by adapting the tube configuration as previously described. In addition, a controller device interfaces the adaptive portion of the tube as well as the electronic engine controller (EEC), as will be well understood by those skilled in the art.

Figure 9C:
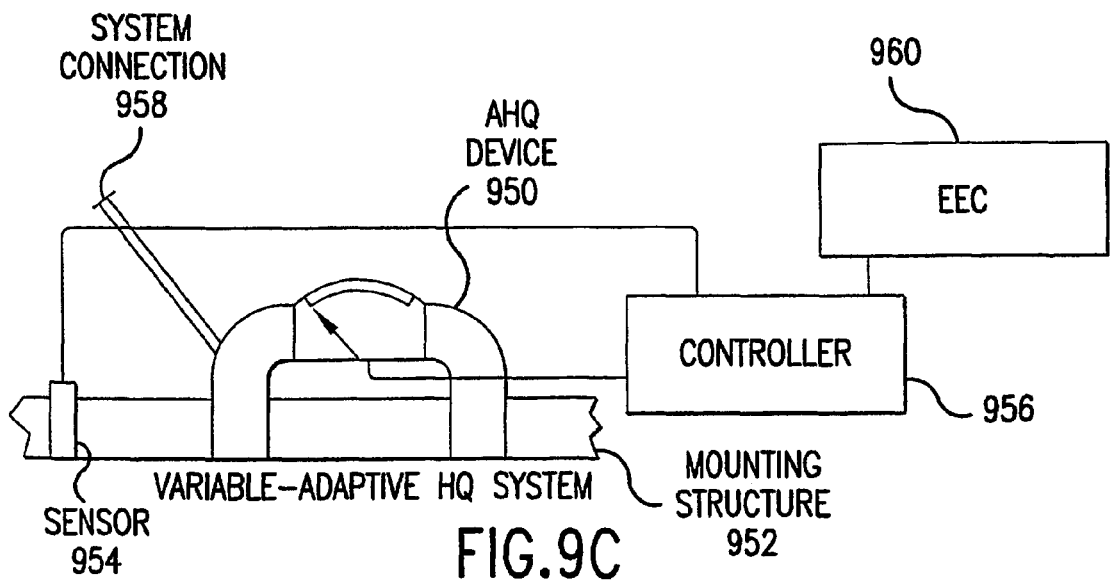
FIG. 9C depicts a "variable-adaptive" Herschel-Quincke tube arrangement in accordance with an embodiment of this invention.

FIG. 9C depicts a "variable-adaptive" Herschel-Quincke tube system mounted on a mounting structure in accordance with an embodiment of this invention. The embodiment of FIG. 9B has at least on sensor, as shown, to collect information regarding the acoustic field and provide that information as an input to a controller device, as will be well understood by those skilled in the art. The controller in turn provides an input signal to the AHQ device to vary the acoustic characteristics of the tube and thereby achieve optimal acoustic attenuation and performance at varying conditions. In embodiments in which the invention is employed in aircraft, for example, the varying conditions and accompanying variation in acoustic characteristics of the tube may correspond to flight conditions such as takeoff, sideline, approach, takeoff cutback, etc. as will be well understood by those skilled in the art. As shown, a system connection provides connection with a power source such as a pneumatic, electrical or hydraulic power source used to achieve the desired positions by adapting the tube configuration as previously described. In addition, the controller device interfaces both the adaptive portion of the tube as well as the electronic engine controller (EEC), as will be well understood by those skilled in the art.

Figure 7:
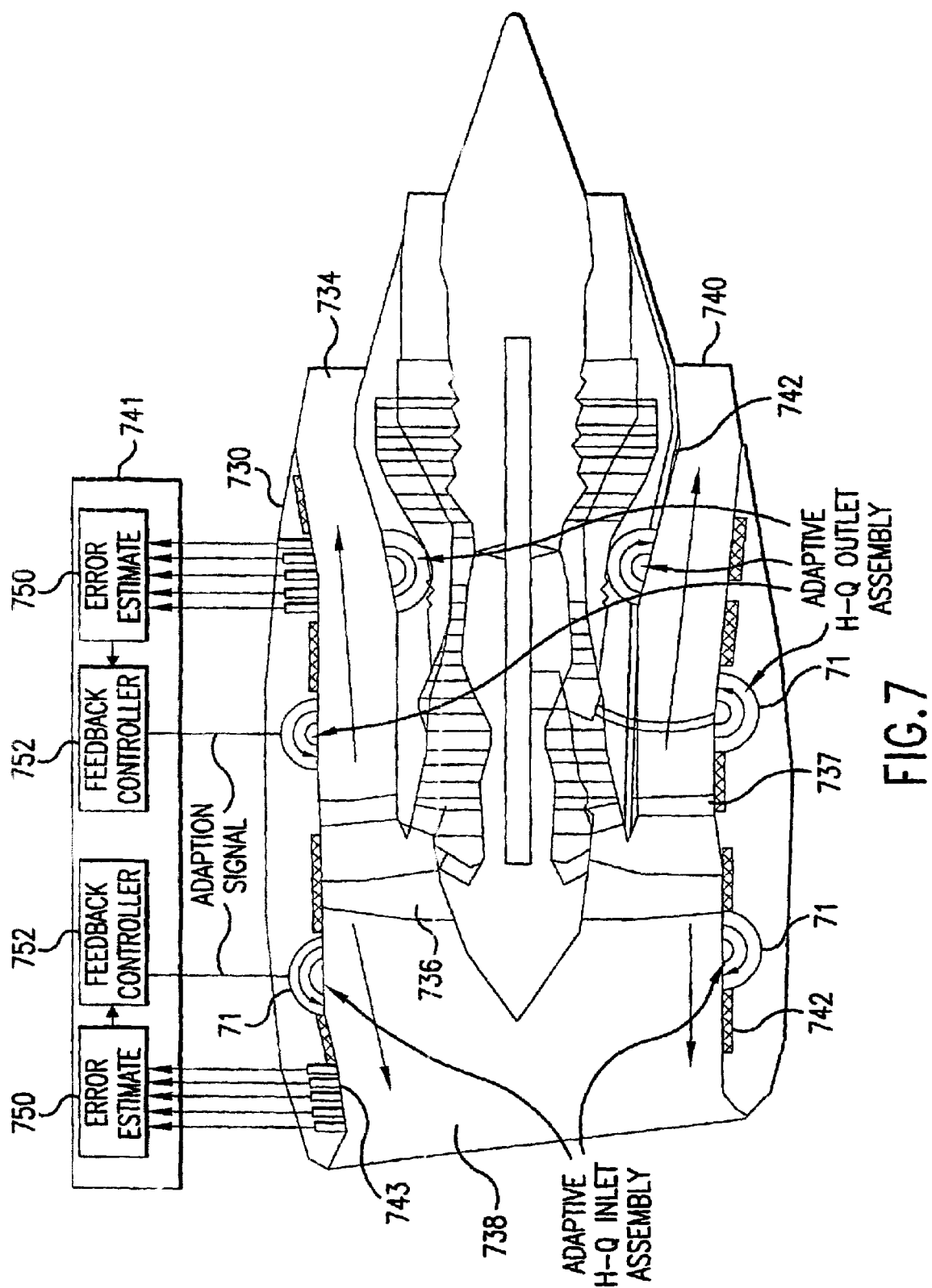
FIG. 7 depicts a side view of multiple arrays of the assembly of this invention applied to the aircraft engine inlet and on both surfaces (inner and outer) of the outlet.

A specific embodiment of the present invention for use with an aircraft turbofan engine may be exemplified by reference to FIG. 7 herein, which has been modified from FIG. 3 of U.S. Pat. No. 6,112,514 and the description therein at col. 5, lines 31–col. 7, line 8.

FIG. 7 shows a specific embodiment of the noise reduction system of the present invention as it applies to a turbofan engine. FIG. 7 further shows the adaptation of the tube properties to optimize the noise reduction at each operational condition of the engine. However, as previously discussed, the noise reduction system of the present invention works equally well with any other system where the noise propagates through tubes or within other enclosed spaces.

In FIG. 7, a turbofan engine 730 has arrays 71 of a plurality of assemblies of this invention individually aligned about an engine compartment 732 including an air passage system 734 is shown. The turbofan engine 730 has a fan 736 located near a fan inlet 738 and guide vanes 737 located at an entry of the air passage system 734, where the air passage system 734 leads to a fan outlet 740. As is evident, the shorter second pipe 12 as exemplified in FIG. 1 is depicted as a portion of the engine compartment 730 and air passage system 734 between the respective inlet and outlet ports of each tube of each array 71. Also, each array 71 is independent of one another and is further preferably identical to one another. However, in embodiments, the arrays or assemblies therein do not have to be identical to one another for the noise reduction system of the present invention to work in its intended manner.

In the specific embodiment of FIG. 7, the arrays 71 are located in the fan inlet 738 and along the air passageway system 734 in a circumferential or helical arrangement. That is, the arrays 71 are mounted both upstream (inlet tubes) and downstream (outlet tubes) from the fan 736. The location of the downstream arrays 71 results in attenuation of the bypass outlet noise radiation towards the rear of the engine at the fan outlet 740, while the upstream location of the arrays 71 results in the attenuation of the noise energy propagating towards and out of the fan inlet 738. Reduction of both the inlet and the outlet noise radiation results in better overall noise reduction. The arrays 71 may also be positioned in other locations with equally good sound reduction results.

In preferred embodiments, the arrays 71 are embedded within a passive liner treatment 742, and may also be near the fan inlet 738 and outlet 740 of the air passage system 734. This allows a combination of the attenuation effects of the arrays 71 with those of the passive liner treatment 742. It is noted that the area occupied by the arrays 71 is only a small fraction of the available surface of the air inlet 738 of the passage system 734. Thus, the presence of the arrays or assemblies comprising the arrays is not detrimental to the performance of the liner 742.

The noise energy generated by the fan 736 is depicted by the arrows in FIG. 7. Unlike in the case of FIG. 1, the sound field generated by the fan 736 is very complex and it is non-uniform in both the axial and azimuth directions. This noise energy propagates through the fan inlet 738, and also propagates through the air passage system 734. Thus, the noise energy generated by the fan 736 propagates towards each of arrays 71 in both the upstream and downstream positions. As seen by the arrows, a component of the noise energy branches off at the inlet of each of the tubes of the arrays 71 (curved arrows) and the remaining component of the noise energy continues upstream and downstream inside the fan inlet (straight arrow). The sound field inside each of the tubes of the arrays 71 in the inlet 738 has the same variation as the sound field on the surface of the inlet 738. The same is the case for the arrays 71 on the air passage 734.

The noise energy propagating through each of the tubes of the arrays 71 has a longer propagation path than the noise energy propagating through the portions of the fan inlet 738 and the air passage system 734 located between the inlet and the outlet portions of each of the tubes of the arrays 71. As previously discussed, the portions of the fan inlet 738 and the air passage system 734 between the inlet and the outlet portions of each of the tubes are equivalent to the shorter second pipe 12 of FIG. 1. At some point in time, the sound energy propagating through each of the tubes of arrays 71 recombines with the sound propagating in the portions of the fan inlet 738 and the air passage system 734 located between the inlet and the outlet portions of each of the arrays. In these instances, the noise energy exiting the outlet of each of the tubes of arrays 71 is in an out-of-phase relation and of similar magnitude to the component of sound energy propagating solely through the portions of the fan inlet 738 and the air passage system 734 between the inlet and the outlet portions of each of the tubes. In addition, the noise energy exiting the outlet of each of the tubes has the same variation as the energy propagating in the portions of the fan inlet 738 and the air passage system 734 located between the inlet and the outlet portions of each of the tubes. This out-of-phase recombination of the noise energy reduces the noise levels generated from the turbofan engine (or other noise generating system).

As previously discussed with reference to FIG. 1, by adjusting the length of the tubes of the arrays 71, or other parameters, such as, for example, cross-sectional area, impedance, internal flow, temperature, etc., the sound can be re-introduced into the fan inlet 738 and an out-of-phase relation from the sound propagating inside the fan inlet 738 and the air passage system 734 to cancel the sound in the shorter second pipe 12 (as depicted in FIG. 1) throughout a range of frequencies as the engine operational condition changes. This can be done by actively controlling the parameters of the tubes, via a control system 741, in response to varying engine operational (e.g., engine speed, angle of attack, etc.) or environmental (e.g., altitude, temperature, etc.) conditions. The control system 741 may contain an error estimator and feedback controller, as shown. In a preferred embodiment, arrays of microphones 743 can be positioned on the inlet 738, the air passage 734, and/or on the aircraft fuselage (not shown) to monitor the acoustic energy generated by the fan 736. The signals from the microphones are input into a control algorithm that adjusts the properties of each of the tubes of the arrays 71 to minimize the noise energy radiated from the inlet 738 and outlet 730. Adjustment is achieved via inputting the signal to the actuators, valves, constrictors and cams described herein to dynamically adjust the acoustic properties of each tube in the assemblies and arrays, as required.

Figure 8B:
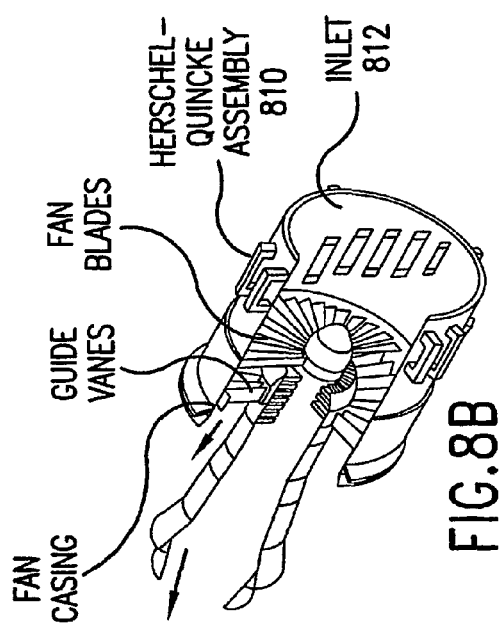
FIGS. 8A–8D depict the assembly of this invention applied to the inlet of a turbofan engines in various configurations.
Figure 8D:
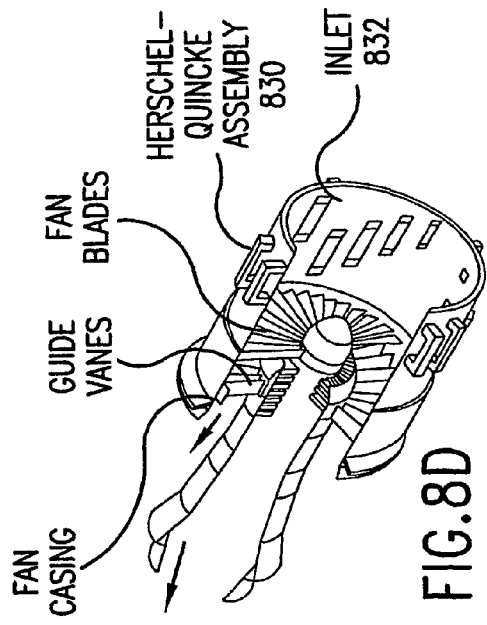
Figure 8A:
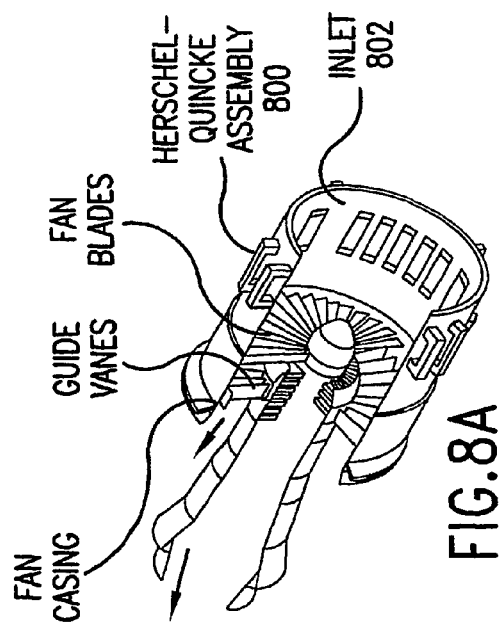
Figure 8C:
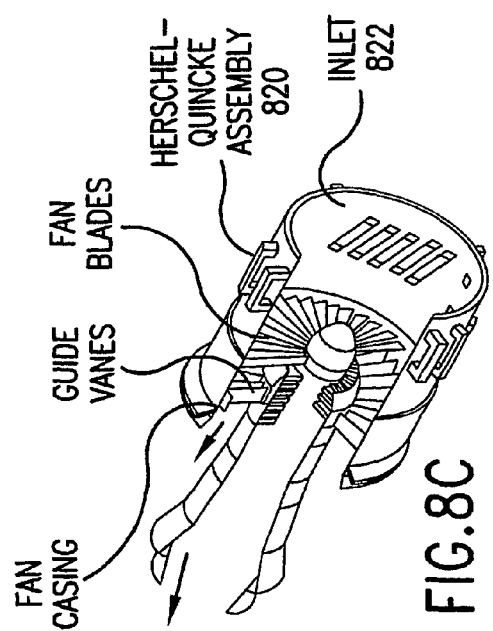

Additional embodiments of the present invention for use with an aircraft turbofan engine may be exemplified by reference to FIGS. 8A–8D herein, which have been modified from FIGS. 4a–4d of U.S. Pat. No. 6,112,514 and the description therein at col. 7, lines 9–29. In FIGS. 8A–8D, a single array of individual assemblies of this invention is positioned on the engine inlet to provide attenuation of sound traveling down a duct at a number of sequences, which are dictated by each tube parameter in the assemblies, such as length, area, and so forth. In the embodiments of FIGS. 8A–8D, the assemblies are aligned in a single array at different locations and alignments, and are separated and independent from one another. For example, FIG. 8A shows the array of assemblies applied to the inlet of the turbofan engine in a circumferential pattern and FIG. 8B shows the array of assemblies in a helical pattern. FIG. 8C shows the array of assemblies applied to the inlet of the turbofan engine in a circumferential pattern with the array of assemblies at an angle with respect to the engine axis, and FIG. 8D shows the array of assemblies in a helical pattern with the array of tubes at an angle with respect to the engine axis. It will be understood by one of ordinary skill in the art that other arrays or assembly arrangements are contemplated for use by the present invention, such as, for example, about either the fan inlet or the fan outlet in a single row, or in various axial alignments.

Figure 10:
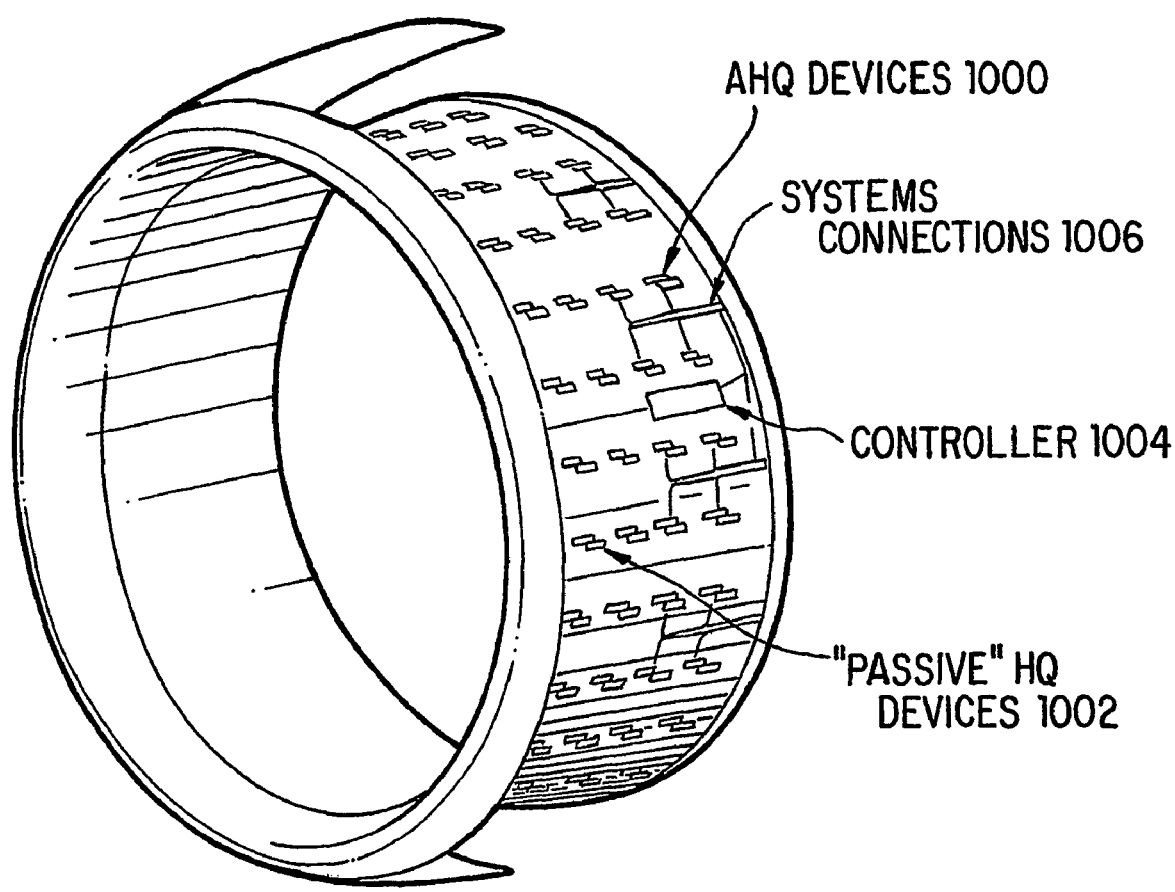
FIG. 10 depicts an embodiment of this invention wherein a plurality of adaptive Herschel-Quincke tubes are employed on an aircraft engine nacelle inlet.

FIG. 10 depicts a typical installation of AHQ devices in accordance with this invention on an aircraft engine nacelle inlet. In FIG. 10, the outer barrel of the nacelle inlet has been removed to permit viewing of the invention as installed. More particularly, in FIG. 10 a combination of at least one AHQ tube of this invention is employed in combination with at least one "passive" HQ tube, and at least one controller for providing input signals to the AHQ tubes as previously described. In a particularly preferred embodiment, an equal number of AHQ and passive HQ tubes may be employed in combination. In the embodiment depicted in FIG. 10, system connections interconnect a plurality of AHQ tubes and a controller, as shown. One or more controllers may be mounted on the nacelle inlet itself, as shown in FIG. 10, or may be mounted in other locations such as elsewhere on the nacelle, or may be incorporated into existing controller systems located elsewhere in the engine control system. Although FIG. 10 depicts a nacelle inlet, in other preferred embodiments of this invention one or more AHQ tubes may be arranged in other engine areas such as the thrust reverser or core cowl.

While the invention has been described in terms of its preferred embodiments, those skilled in the art will recognize that the invention can be practiced with modification within the spirit and scope of the appended claims.

The invention claimed is:

1. An assembly for reducing noise comprising: (i) at least one tube having an inlet end, an outlet end and a central tube portion therebetween; and (ii) at least one actuator operatively interconnected to at least one tube, wherein the actuator is capable of causing dynamic response by the tube, wherein the actuator is pivotably affixed at one end proximate to the tube inlet and pivotably affixed at the other end proximate to the tube outlet, and the inlet and outlet portions of the tube are interconnected by a bellows which forms the central tube portion.

2. The assembly of claim 1, in which the actuator is responsive to a control signal.

3. The assembly of claim 1, in which actuator comprises a cam capable of translating force to the tube.

4. The assembly of claim 1, in which the tube is pivotably affixed at the inlet and outlet ends.

5. The assembly of claim 1, in which one actuator is operatively interconnected to one tube.

6. The assembly of claim 1, in which one actuator is operatively interconnected to a plurality of tubes.

7. A method for reducing noise comprising:
(a) providing means for generating non-uniform noise energy about an inner surface and within an enclosure having at least an inlet;
(b) providing an assembly for reducing noise comprising: (i) at least one tube having an inlet end, an outlet end and a central tube portion therebetween; and (ii) at least one actuator operatively interconnected to at least one tube, wherein the actuator is capable of causing dynamic response by the tube, wherein the actuator is pivotably affixed at one end proximate to the tube inlet and pivotably affixed at the other end proximate to the tube outlet, and the inlet and outlet portions of the tube are interconnected by a bellows which forms the central tube portion; and
(c) directing at least a portion of the non-uniform noise into the assembly.

8. A system for reducing noise comprising:
(a) providing means for generating non-uniform noise energy about an inner surface and within an enclosure having at least an inlet; and
(b) providing an assembly for reducing noise comprising: (i) at least one tube having an inlet end, an outlet end and a central tube portion therebetween; and (ii) at least one actuator operatively interconnected to at least one tube, wherein the actuator is capable of causing dynamic response by the tube, wherein the actuator is pivotably affixed at one end proximate to the tube inlet and pivotably affixed at the other end proximate to the tube outlet, and the inlet and outlet portions of the tube are interconnected by a bellows which forms the central tube portion.

* * * * *